United States Patent
Reigo

(10) Patent No.: US 10,928,833 B2
(45) Date of Patent: Feb. 23, 2021

(54) NAVIGATION FOR A ROBOTIC WORK TOOL

(71) Applicant: HUSQVARNA AB, Huskvarna (SE)

(72) Inventor: Peter Reigo, Djursholm (SE)

(73) Assignee: HUSQVARNA AB, Huskvarna (SE)

( * ) Notice: Subject to any disclaimer, the term of this patent is extended or adjusted under 35 U.S.C. 154(b) by 312 days.

(21) Appl. No.: 15/780,916

(22) PCT Filed: Dec. 2, 2015

(86) PCT No.: PCT/EP2015/078332
§ 371 (c)(1),
(2) Date: Jun. 1, 2018

(87) PCT Pub. No.: WO2017/092798
PCT Pub. Date: Jun. 8, 2017

(65) Prior Publication Data
US 2018/0348790 A1    Dec. 6, 2018

(51) Int. Cl.
*G05D 1/02* (2020.01)
*G01S 19/14* (2010.01)
(Continued)

(52) U.S. Cl.
CPC .......... *G05D 1/0278* (2013.01); *G01S 19/14* (2013.01); *G01S 19/41* (2013.01); *G01S 19/43* (2013.01);
(Continued)

(58) Field of Classification Search
CPC .............. G05D 1/0278; G05D 1/0219; G05D 2201/0208; G01S 19/14; G01S 19/41; G01S 19/43
See application file for complete search history.

(56) References Cited

U.S. PATENT DOCUMENTS

| 6,268,824 B1 | 7/2001 | Zhodzishky et al. |
| 6,338,013 B1 | 1/2002 | Ruffner |
| (Continued) | | |

FOREIGN PATENT DOCUMENTS

| CN | 101295014 B | 10/2008 |
| CN | 102298151 B | 12/2011 |
| (Continued) | | |

OTHER PUBLICATIONS

International Search Report and Written Opinion for International Application No. PCT/EP2015/078332 dated Aug. 22, 2016.
(Continued)

*Primary Examiner* — Russell Frejd
(74) *Attorney, Agent, or Firm* — Burr & Forman, LLP

(57) ABSTRACT

A robotic work tool for movable operation within a work area. The robotic lawnmower comprises a satellite navigation device; and a controller, the controller being configured to cause the robotic work tool to movably operate within the work area based on positions partly or in whole determined from satellite signals received by the satellite navigation device being a differential satellite navigation device and on phase information received from a reference station, by: receiving phase information from the reference station for a satellite signal received by the reference station; storing the phase information; determining that further phase information from the reference station for the satellite signal received by the reference station is not available or erroneous, and in response thereto; extrapolating phase information based on the stored phase information; receiving a satellite signal received by the robotic work tool; comparing the extrapolated phase information to phase information of the satellite signal received by the robotic work tool; determining a position based on the comparison for movably operating the robotic work tool.

14 Claims, 4 Drawing Sheets

(51) Int. Cl.
*G01S 19/41* (2010.01)
*G01S 19/43* (2010.01)

(52) U.S. Cl.
CPC ... *G05D 1/0219* (2013.01); *G05D 2201/0208* (2013.01)

(56) References Cited

U.S. PATENT DOCUMENTS

| | | | |
|---|---|---|---|
| 7,522,099 | B2 | 4/2009 | Zhodzishsky et al. |
| 7,982,667 | B2 | 7/2011 | Vollath et al. |
| 8,242,953 | B2 | 8/2012 | Dai et al. |
| 2003/0208302 | A1* | 11/2003 | Lemelson .............. G05B 19/19 700/245 |
| 2009/0135057 | A1 | 5/2009 | Vollath et al. |
| 2010/0103032 | A1 | 4/2010 | Zhodzishsky et al. |
| 2012/0179305 | A1* | 7/2012 | Kim .................... B66C 19/007 701/2 |
| 2015/0328775 | A1* | 11/2015 | Shamlian ............ G05D 1/0234 700/258 |
| 2016/0278285 | A1* | 9/2016 | Reigo .................... B60L 1/003 |
| 2016/0334795 | A1* | 11/2016 | Reigo .................... B60L 1/003 |
| 2017/0031368 | A1* | 2/2017 | Reigo ................. G05D 1/0265 |
| 2017/0357006 | A1* | 12/2017 | Ohrlund ................ G01S 19/14 |

FOREIGN PATENT DOCUMENTS

| | | |
|---|---|---|
| WO | 2014/099379 A1 | 6/2014 |
| WO | 2015/072897 A1 | 5/2015 |

OTHER PUBLICATIONS

Chang, C.C. and Lee, H.Y., "Performance of High Rate Interpolated Data Applied to GPS Kinematic Positioning," Survey Review, 43, 321 (Jul. 2011), © 2011 Survey Review Ltd., pp. 303-313.
Schüler, T. "10 Hz or 10 s?," Original Article, GPS Solut (2007) 11, © Springer-Verlag 2006, pp. 77-83.
International Preliminary Report on Patentability for International Application No. PCT/EP2015/078332 dated Jun. 5, 2018.

* cited by examiner

NAVIGATION FOR A ROBOTIC WORK TOOL

TECHNICAL FIELD

This application relates to a robotic work tool, a robotic work tool system, a method and a computer-readable storage medium for improved navigation of a robotic work tool.

BACKGROUND

Conventional robotic lawnmowers usually operate within a work area in a garden or other work area (such as a foot ball foiled for instance). As would be apparent it is of importance that the robotic lawnmower does no escape the work area. Also, to provide an evenly cut lawn, the robotic lawnmower need to traverse the entire work area in an even fashion or uncut areas, or areas that are cut too hard will result.

Some contemporary robotic lawnmowers employ satellite navigation to enhance the robotic lawnmower's ability for accurate navigation within the work area. As is well known per se, a satellite navigation or sat nav system is a system of satellites that provide autonomous geo-spatial positioning with global coverage. It allows small electronic receivers to determine their location (longitude, latitude, and altitude) to within a few metres, or even centimetres, using radiowaves transmitted by radio from satellites. Receivers process the precise time as well as position and carrier phase. A satellite navigation system with global coverage may be termed a global navigation satellite system or GNSS (Global Navigation Satellite System).

Particularly good accuracy of GNSS systems is obtained by using one or more fixed, land-based reference receivers in addition to the satellites. This is called differential GNSS. There are several DGNSS techniques, such as the classical DGNSS (or DGPS), the Real Time Kinematics (RTK) and the Wide Area RTK (WARTK).

Differential GNSS, such as Real Time Kinematics (RTK), systems operate by comparing a satellite signal received by the robot (or rover receiver) with a satellite signal received by a reference station (or master receiver). Instead of processing the information content of a satellite signal, the phase difference between a first satellite signal received at the rover and a second satellite signal received at the reference station is processed. This provides for an improved accuracy from 5-10 m to mere centimetres.

However, the use of GNSS systems requires good reception of satellite signals to work reliably. For a robotic lawnmower which employs satellite navigation, the heterogeneous and compact nature of the typical work area (i.e., the lawn in a garden) will pose an additional challenge. If the satellite signals become blocked by buildings, roofs, sheds, trees, garden umbrellas, awnings, foliage, etc, in or near the work area, the robotic lawnmower may lose track and be momentarily prevented from continuing with satellite navigation-based operation in the work area. For differential GNSS, the signal from a reference receiver may likewise be blocked by, for example, any of the obstacles mentioned above and/or by radio disturbances such as interference, multi-path propagation delay, etc.

If, because of a momentary situation as described above, the robotic lawnmower loses track of the GNSS signals and is therefore momentarily prevented from continuing with satellite navigation-assisted operation in the work area, several problems may arise.

Especially in populated areas, such as in a garden where kids or pets may be playing, it is of importance that the operation of a robotic lawnmower is reliable and accurate.

In view of the problems and shortcomings indicated above, there is a need for an improved manner of operation for a robotic lawnmower in a heterogeneous and compact work area.

It should be noted that the problems above and the solutions below are also applicable to other robotic work tools, such as farming equipment, golf ball collectors, mine clearance robots etc to name a few examples.

SUMMARY

The inventors of the present invention have realized, after inventive and insightful reasoning, that it by extrapolating the satellite signal received from the reference station differential GNSS may be used even in areas where the satellite signal received by the reference station is (at least temporarily) not received, either because the reference station is blocked from receiving satellite signals or because the signal from the reference station is blocked.

It is therefore an object of the teachings of this application to overcome one or more of the problems and shortcomings listed above by providing a robotic work tool for movable operation within a work area. The robotic lawnmower comprises a satellite navigation device; and a controller, the controller being configured to cause the robotic work tool to movably operate within the work area based on positions partly or in whole determined from satellite signals received by the satellite navigation device being a differential satellite navigation device and on phase information received from a reference station, by: receiving phase information from the reference station for a satellite signal received by the reference station; storing the phase information; determining that further phase information from the reference station for the satellite signal received by the reference station is not available or erroneous, and in response thereto; extrapolating phase information based on the stored phase information; receiving a satellite signal received by the robotic work tool; comparing the extrapolated phase information to phase information of the satellite signal received by the robotic work tool; determining a position based on the comparison for movably operating the robotic work tool.

It is also an object of the teachings of this application to overcome one or more of the problems and shortcomings listed above by providing a robotic work tool system comprising a charging station and a robotic work tool according to the above.

In one embodiment the robotic work tool is a robotic lawnmower.

In one embodiment the robotic work tool is a golfball collector.

In one embodiment the robotic work tool is farming equipment.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

It is a further object of the teachings of this application to overcome one or more of the problems and shortcomings listed above by providing a method of controlling a robotic work tool method of controlling a robotic lawnmower for movable operation within a work area based on positions partly or in whole determined from satellite signals received by a satellite navigation device being a differential satellite navigation device and on phase information received from a reference station, the method comprising: receiving phase information from the reference station for a satellite signal received by the reference station; storing the phase information; determining that further phase information from the reference station for the satellite signal received by the reference station is not available or erroneous, and in response thereto; extrapolating phase information based on the stored phase information; receiving a satellite signal received by the robotic work tool; comparing the extrapolated phase information to phase information of the satellite signal received by the robotic work tool; determining a position based on the comparison for movably operating the robotic work tool.

It is moreover an object of the teachings of this application to overcome one or more of the problems and shortcomings listed above by providing a computer readable storage medium encoded with instructions that, when executed on a processor, perform the method referred to above.

Using the teachings herein, a robotic lawnmower is thus provided which does not stop or discontinue its operation as it loses satellite or radio reception. Furthermore, as the inventors have realized that for a robotic lawnmower operating in a garden, a minor deviation from an expected trajectory will most likely not have catastrophic consequences and an unsupervised continued operation relying on extrapolation of previous data for a short time may thus be used, unlike for example an unsupervised tractor used to plough a field in the vicinity of living arrangements. The robotic lawnmower may thus be arranged to continue operation according to the objects above thereby solving the problems for example listed in the background section.

It should be noted that although the embodiments herein focus on satellite reception, the teachings herein may also be used for other reception, such as radio reception.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
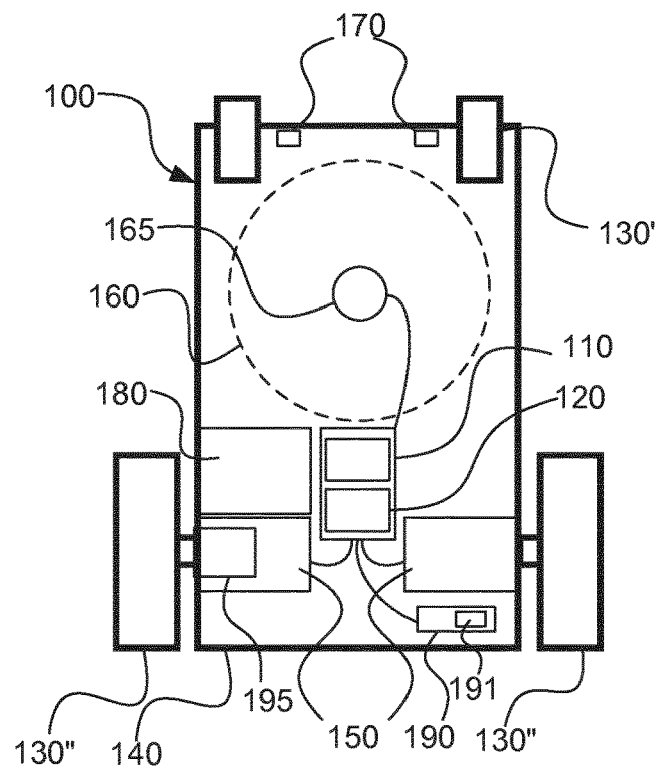
FIG. 1 shows a schematic overview of a robotic lawnmower according to one embodiment of the teachings of this application.

FIG. 1 shows a schematic overview of a robotic lawnmower 100 having a body 140 and a plurality of wheels 130. In the exemplary embodiment of FIG. 1 the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are two sensors 170, arranged to detect a magnetic field (not shown). If present, the sensors 170 will be connected to the controller 110, and the controller 110 will be configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic lawnmower 100 is close to or crossing a boundary wire, or inside or outside an area enclosed by the boundary wire.

The robotic lawnmower 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 is also arranged with a satellite navigation device 190 which comprises a satellite signal receiver 191. In the disclosed embodiment, the satellite signal receiver 191 is a GNSS (Global Navigation Satellite System) satellite signal receiver, such as a GPS (Global Positioning System) satellite signal receiver or GLONASS or a combination of the two. The satellite navigation device 190 is connected to the controller 110 for enabling the controller 110 to determine current positions for the robotic lawnmower 100 using the satellite navigation device 190 and to control the movements of the robotic lawnmower 100 based on the determined positions.

The satellite navigation device 190 is a differential GNSS device arranged to receive a reference signal from a base receiver or reference station (shown and referenced 270 in FIG. 2), possibly being comprised in the robotic work tool system.

The robotic lawnmower 100 may further comprises at least one supplemental navigation sensor 195, such as a deduced reckoning navigation sensor for providing signals for deduced reckoning navigation, also referred to as dead reckoning. Examples of such deduced reckoning navigation sensor(s) 195 are odometers and compasses. The supplemental navigation sensor may also or alternatively be implemented as a vision navigation system, Ultra Wide Band radio navigation system to mention a few examples. The supplemental sensor 195 will hereafter be exemplified through the deduced reckoning sensor.

The robotic lawnmower 100 may further be arranged with a wireless communication interface 197 for communicating with other devices, such as a server, a personal computer or smartphone, or the charging station. Examples of such wireless communication devices are Bluetooth™, Global System Mobile (GSM) and LTE (Long Term Evolution), to name a few.

In addition, the robotic lawnmower 100 may be arranged with collision sensor means for detecting when the robotic lawnmower 100 runs into an obstacle. The collision sensor means may be one or more separate sensors (such as accelerometers, pressure sensors or proximity sensors) arranged in or on the housing of the robotic lawnmower 100 and capable of detecting an impact caused by a collision between the robotic lawnmower 100 and an obstacle. Alternatively, the collision sensor means may be implemented as a program routine run by the controller 110, being effective to detect a sudden decrease of the rotational speed of any of the drive wheels 130" and/or sudden increase in the drive current to the electric motor 150.

Figure 2:
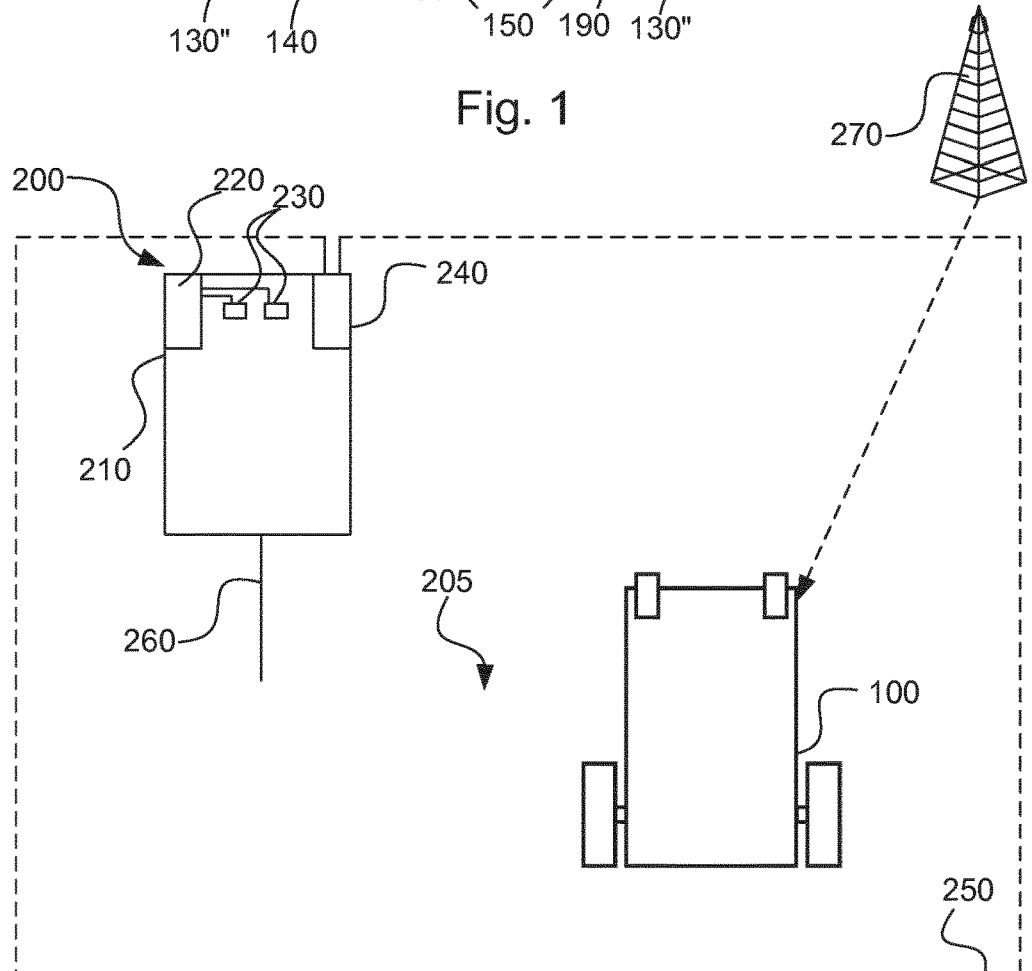
FIG. 2 shows a schematic view of a robotic working tool system with a robotic lawnmower according to one embodiment of the teachings of this application.

FIG. 2 shows a schematic view of a robotic lawnmower system 200 in one embodiment. The schematic view is not to scale. The robotic lawnmower system 200 comprises a charging station 210 and a boundary 250 arranged to enclose a work area 205, in which the robotic lawnmower 100 is supposed to serve. The robotic lawnmower 100 uses the satellite navigation device 190 to remain within and map the work area 205 by comparing the successive determined positions of the robotic lawnmower 100 against a set of geographical coordinates defining the boundary 250, obstacles, keep-out areas etc of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic lawnmower 100 will detect. As the robotic lawnmower 100 (or more accurately, the sensor 170) crosses the boundary wire 250 the direction of the magnetic field will change. The robotic lawnmower 100 will thus be able to determine that the boundary wire has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 mainly uses the satellite navigation device 190, supported by the deduced reckoning navigation sensor 195 as will be described in some more detail further below. The charging station 210 may further comprise or be configured to act as a reference station or base station for navigational purposes.

The use of more than one sensor 170 enables the controller 110 of the robotic lawnmower 100 to determine how the robotic lawnmower 100 is aligned with relation to the boundary wire 250 (if such is used) by comparing the sensor signals received from each sensor 170. This enables the robotic lawnmower to follow the boundary wire 250, for example when returning to the charging station 210 for charging. Optionally, the charging station 210 may have a guide cable 260 for enabling the robotic lawnmower to find the entrance of the charging station 210. In one embodiment the guide cable 260 is formed by a loop of the boundary wire 250. In one embodiment the guide wire 260 is used to generate a magnetic field for enabling the robotic lawnmower 100 to find the charging station without following a guide cable 260.

Figure 3:
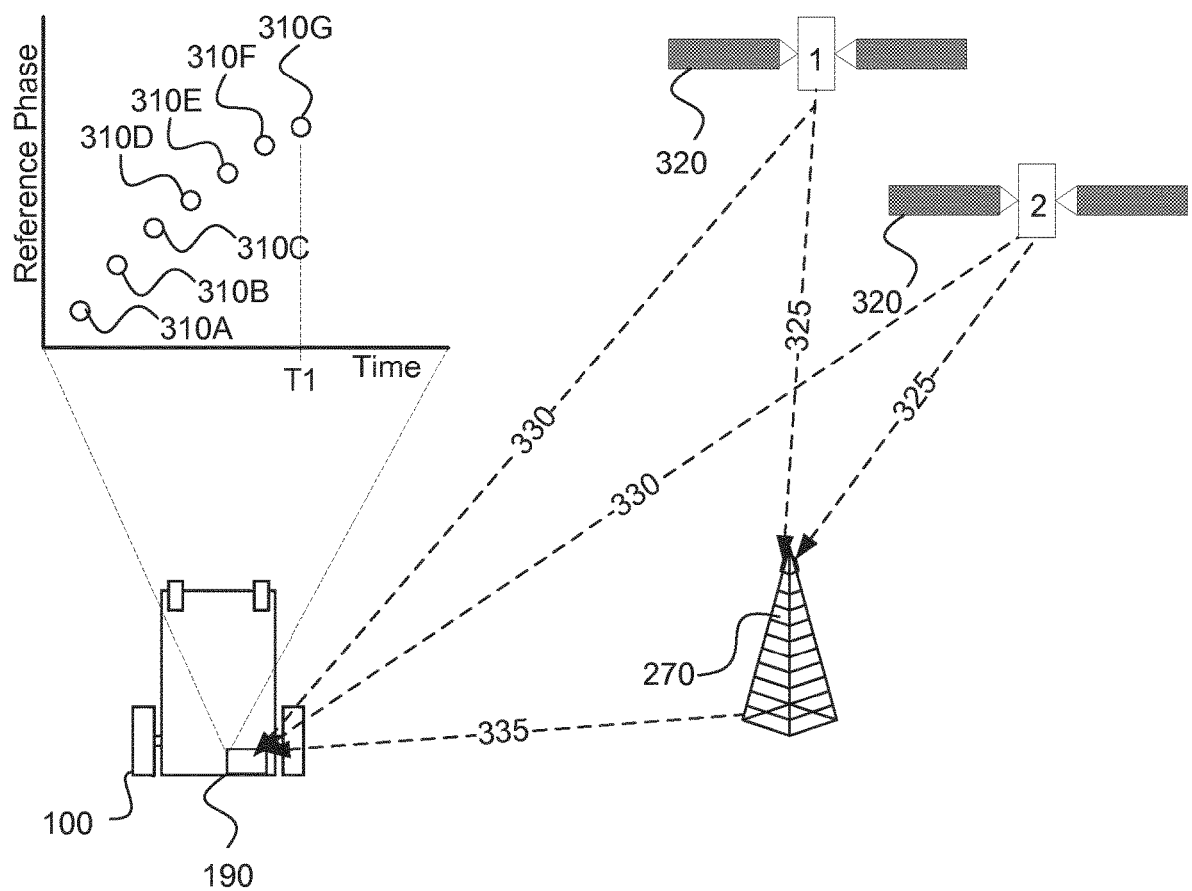
FIG. 3 shows a schematic view of a robotic working tool system according to one embodiment of the teachings of this application.

FIG. 3 shows a schematic view of a robotic lawnmower system 200 comprising a robotic work tool, such as a robotic lawnmower of FIG. 1. A reference station 270, possibly being part of the robotic work tool system, is arranged to receive signals from at least one satellite 320. The robotic work tool may be configured to receive satellite signals from satellites belonging to different satellite systems (GNSS).

The reference station 270 is thus arranged to receive at least one reference signal which it processes to among all determine the phase of the signal. The reference station 270 transmits among all information on the phase (which could be the satellite signal received by the reference station 325) to the robotic work tool 100 through a communication channel as indicated by the dashed arrow referenced 335. As would be understood by a skilled person there are many possibilities for how to implement such a communication channel 335, such as dedicated Radio frequency communication, optical communication, Bluetooth communication, WiFi communication, cellular communication being some examples.

The receiving satellite navigation device 190 extracts a current phase, corresponding to a distance, for a satellite signal received by the reference station 325 at a specific time and compares this to the same corresponding satellite signal received by the robotic work tool 100. Several such phases 310 will be transmitted from the reference station 270 to the robotic work tool 100 as is indicated by the graph of FIG. 3, plotting the phases for the satellite signal received by the reference station 325 to the times they correspond to. It should be noted that the graph of FIG. 3 is only for exemplifying purposes and a real-life graph may differ from this example graph.

This is normal operation for a differential GNSS system and will not be discussed in further detail.

However, if after a time T1 (corresponding to phase 310G), no signal is received from the reference station 270 on the phase of a specific satellite signal received by the reference station 325, possibly due to the reference station being blocked from satellite reception or the communication channel 335 being blocked or congestion in the communication channel, the satellite navigation device would not be able to operate as a differential GNSS device and the robotic work tool 100 would have to rely on normal GNSS navigation (with a much lower accuracy), deduced navigation or the boundary marker (if such is available). Alternatively, the robotic work tool 100 would have to stop and wait until phase data is received again through the communication channel 335.

The inventors therefore propose a solution where reference phases are extrapolated from the received phases for the satellite signal received by the reference station 325. Such extrapolation may be achieved by applying or fitting a curve to the previously received phases 310.

Figure 4:
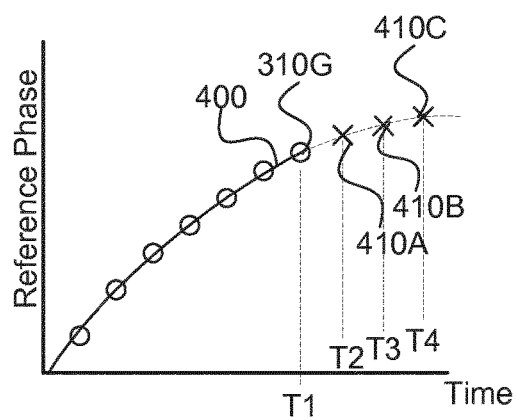
FIG. 4 shows a schematic plotting of reference phases to time according to one embodiment of the teachings herein.

FIG. 4 shows a schematic graph of phases for the satellite signal received by the reference station 325 being plotted against times, where a curve 400 has been applied or fitted to the previously received phases 310.

In one embodiment the robotic work tool 100 is configured to fit a curve 400 based on the previously received phases 310, such as through using a least squares curve.

In one embodiment the robotic work tool 100 is configured to fit a curve 400 based on the motion of the corresponding satellite 320. As the time and motion of GNSS satellites are known, such a curve may be derived for a reference station 270, or even provided by the satellite operator.

There will be made no difference if the curve is fitted by a processor of the robotic work tool 100 or by a processor of the satellite navigation device in the context of this application, or by 270, both processors being regarded as part of the controller 100.

In one embodiment, the curve 400 used represents the carrier phase changes without noise.

In one such embodiment, the robotic work tool 100 is configured to filter the previously received phases 310 for noise, such as by removing irregular phases or applying a smoothening operation to the phases 310.

This will enable the satellite navigation device 190 to provide extrapolated phases 410A, 410B, 410C for the reference signal at later time points T2, T3, T4 to enable continued operation based on differential GNSS navigation, during the time when no phase information is received from the reference station 270.

Figure 5:
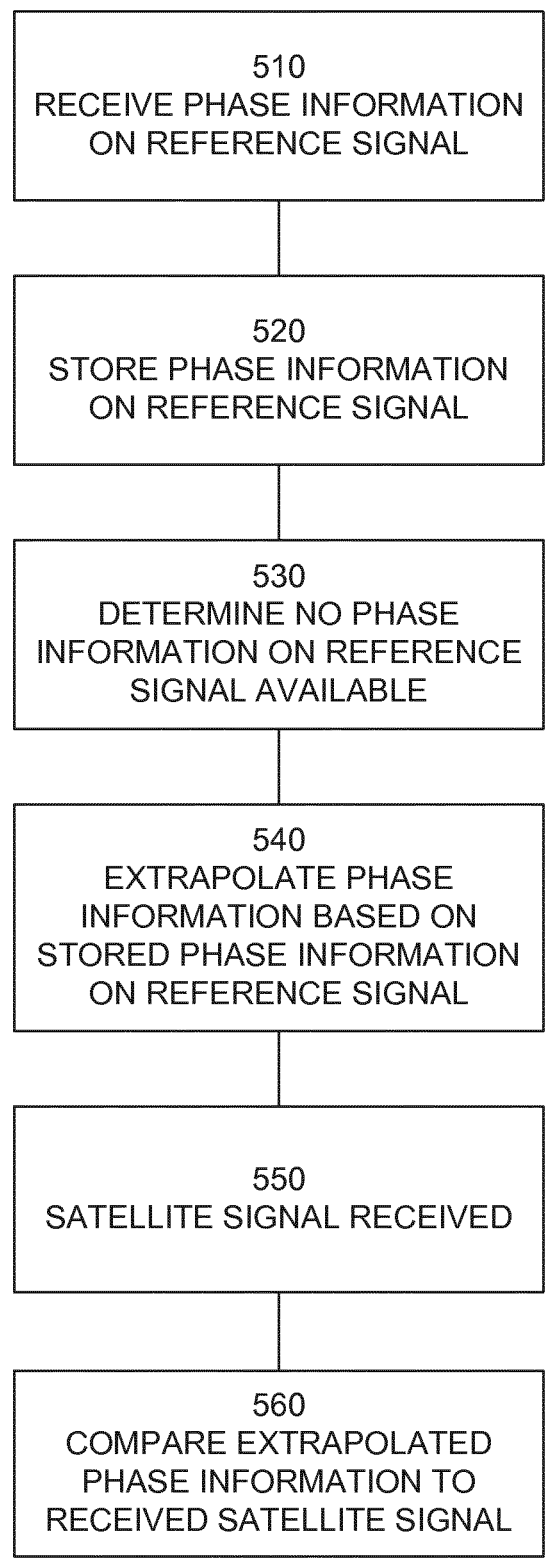
FIG. 5 shows a flowchart for a general method of controlling a robotic lawnmower for movable operation within a work area, according to the teachings herein.

FIG. 5 shows an exemplifying flowchart for a general method of operating the robotic lawnmower 100 in a manner which solves, eliminates or at least mitigates the problems and shortcomings associated with the prior art. Generally speaking, the method in FIG. 5 is based on the inventive understanding that for situations when the robotic lawnmower 100 is momentarily prevented from continuing with differential satellite navigation-based operation in the work area 250 because of a momentary loss of reception of a signal from the reference station 270, the movement or propulsion of the robotic lawnmower 100 continues based on Differential GNSS navigation based on extrapolated phases for the reference signal.

The robotic work tool 100 receives 510 phase information for a satellite signal received by the reference station, 325, from the reference station 270 and stores the phase information 520, the phase information corresponding to the phase 310 of the satellite signal received by the reference station 325. As the robotic work tool 100 determines that no phase or erroneous information is available 530 from the reference station 270, the robotic work tool 100 extrapolates 540 phase information based on the stored and previously received phase information. The robotic work tool 100 receives a signal 550 from a corresponding satellite and continues operating based on differential GNSS navigation where the extrapolated phase 410 is compared to the phase of the satellite signal received by the robotic work tool 330. In one embodiment the extrapolation may be done based on previous patterns of the received signal.

Figure 6:
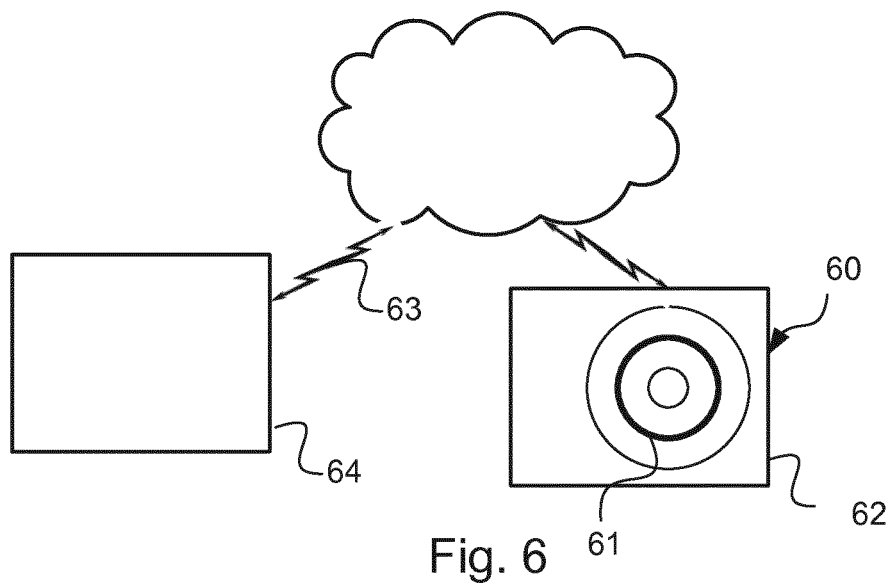
FIG. 6 shows a schematic view of a computer-readable medium according to the teachings herein.

FIG. 6 shows a schematic view of a computer-readable medium as described in the above. The computer-readable medium 60 is in this embodiment a data disc 60. In one embodiment the data disc 60 is a magnetic data storage disc. The data disc 60 is configured to carry instructions 61 that when loaded into a controller, such as a processor, execute a method or procedure according to the embodiments disclosed above. The data disc 60 is arranged to be connected to or within and read by a reading device 62, for loading the instructions into the controller. One such example of a reading device 62 in combination with one (or several) data disc(s) 60 is a hard drive. It should be noted that the computer-readable medium can also be other mediums such as compact discs, digital video discs, flash memories or other memory technologies commonly used. In such an embodiment the data disc 60 is one type of a tangible computer-readable medium 60.

The instructions 61 may also be downloaded to a computer data reading device 64, such as the controller 110 or other device capable of reading computer coded data on a computer-readable medium, by comprising the instructions 61 in a computer-readable signal 63 which is transmitted via a wireless (or wired) interface (for example via the Internet) to the computer data reading device 64 for loading the instructions 61 into a controller. In such an embodiment the computer-readable signal 63 is one type of a non-tangible computer-readable medium 60.

The instructions may be stored in a memory (not shown explicitly in FIG. 6, but referenced 120 in FIG. 1) of the computer data reading device 64.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool for movable operation within a work area, the robotic work tool comprising:
   a satellite navigation device; and
   a controller, the controller being configured to cause the robotic work tool to movably operate within the work area based on positions partly or in whole determined from satellite signals received by the satellite navigation device being a differential satellite navigation device and on phase information received from a reference station, by:
   receiving phase information from the reference station for a satellite signal received by the reference station;
   storing the phase information;
   determining that further phase information from the reference station for the satellite signal received by the reference station is not available or erroneous, and in response thereto:
      extrapolating phase information based on the stored phase information;
      receiving a satellite signal received by the robotic work tool;
      comparing the extrapolated phase information to phase information of the satellite signal received by the robotic work tool; and
      determining a position based on the comparison for movably operating the robotic work tool.

2. The robotic work tool as defined in claim 1, wherein the phase information is the phase for the satellite signal received by the reference station.

3. The robotic work tool as defined in claim 1, wherein the robotic work tool is further configured to extrapolate by fitting a curve based on the stored phase information to the stored phase information.

4. The robotic work tool as defined in claim 1, wherein the robotic work tool is further configured to extrapolate by fitting a curve based on movement of a corresponding satellite to the stored phase information.

5. The robotic work tool as defined in claim 1, wherein the satellite navigation device is a Real Time Kinematics Global Positioning System device.

6. The robotic work tool as defined in claim 1, wherein the robotic work tool is required to operate in the work area in a methodical and systematic or position oriented manner.

7. The robotic work tool as defined in claim 1, wherein the robotic work tool is a robotic lawnmower.

8. A robotic work tool system comprising a charging station and the robotic work tool according to claim 1.

9. The robotic work tool system as defined in claim 8 further comprising the reference station.

10. The robotic work tool as defined in claim 1, wherein extrapolating the phase information comprises extrapolating the phase information in accordance with a fitted curve that is a least squares curve.

11. The robotic work tool as defined in claim 1, wherein extrapolating the phase information comprises filtering the phase information received from the reference station for noise by applying a smoothing operation to the phase information.

12. The robotic work tool as defined in claim 1, wherein the further phase information from the reference station for the satellite signal received by the reference station is determine to be not available due to a loss of reception of a signal comprising the further phase information from the reference station.

13. A method of controlling a robotic work tool, by a controller of the robotic work tool, for movable operation within a work area based on positions partly or in whole determined from satellite signals received by a satellite navigation device being a differential satellite navigation device and on phase information received from a reference station, the method comprising:
   receiving phase information from the reference station for a satellite signal received by the reference station;
   storing the phase information;
   determining that further phase information from the reference station for the satellite signal received by the reference station is not available, and in response thereto:
      extrapolating phase information based on the stored phase information;
      receiving a satellite signal received by the robotic work tool;
      comparing the extrapolated phase information to phase information of the satellite signal received by the robotic work tool; and
      determining a position based on the comparison for movably operating the robotic work tool.

14. A non-transitory computer readable storage medium encoded with instructions that, when executed on a processor, perform the method according to claim 13.

* * * * *